United States Patent [19]
Leturmy

[11] Patent Number: 5,725,143
[45] Date of Patent: Mar. 10, 1998

[54] METHOD AND MACHINE FOR WAVE SOLDERING OR TINNING

[75] Inventor: Marc Leturmy, Garanciere, France

[73] Assignee: L'Air Liquide, Societe Anonyme pour l'Etude et l'Exploitation des Procedes Georges Claude, Paris, France

[21] Appl. No.: 659,042

[22] Filed: Jun. 3, 1996

[30] Foreign Application Priority Data

May 7, 1996 [FR] France .................. 96 05724

[51] Int. Cl.$^6$ .............................. H05K 3/34; B23K 1/00; B23K 3/00
[52] U.S. Cl. .............................. 228/37; 228/42; 228/219; 118/63; 118/410; 427/96
[58] Field of Search .............................. 228/37, 42, 219, 228/180.21, 180.22; 118/63, 410; 427/96

[56] References Cited

U.S. PATENT DOCUMENTS 5,409,159  4/1995  Connors et al. .......................... 228/42

FOREIGN PATENT DOCUMENTS 621101   4/1993  European Pat. Off. .
713742   5/1996  European Pat. Off. .
2727044  5/1996  France .

*Primary Examiner*—Samuel M. Heinrich
*Attorney, Agent, or Firm*—Burns, Doane, Swecker & Mathis, LLP

[57] ABSTRACT

Wave soldering or tinning machine comprising:
  a solder reservoir;
  a means that forms at least one solder wave having a laminar form and including a flat surface;
  a means for bringing a piece to be soldered or tinned into contact with the laminar wave; and
  means for injection of a gas in the vicinity of the wave comprising an injector located in a position adjacent to and downstream from the wave and provided with a wall facing the solder wave, wherein the wall has at least a first group of openings positioned so as to produce a first gas jet directed toward the flat surface of the solder wave.

20 Claims, 7 Drawing Sheets

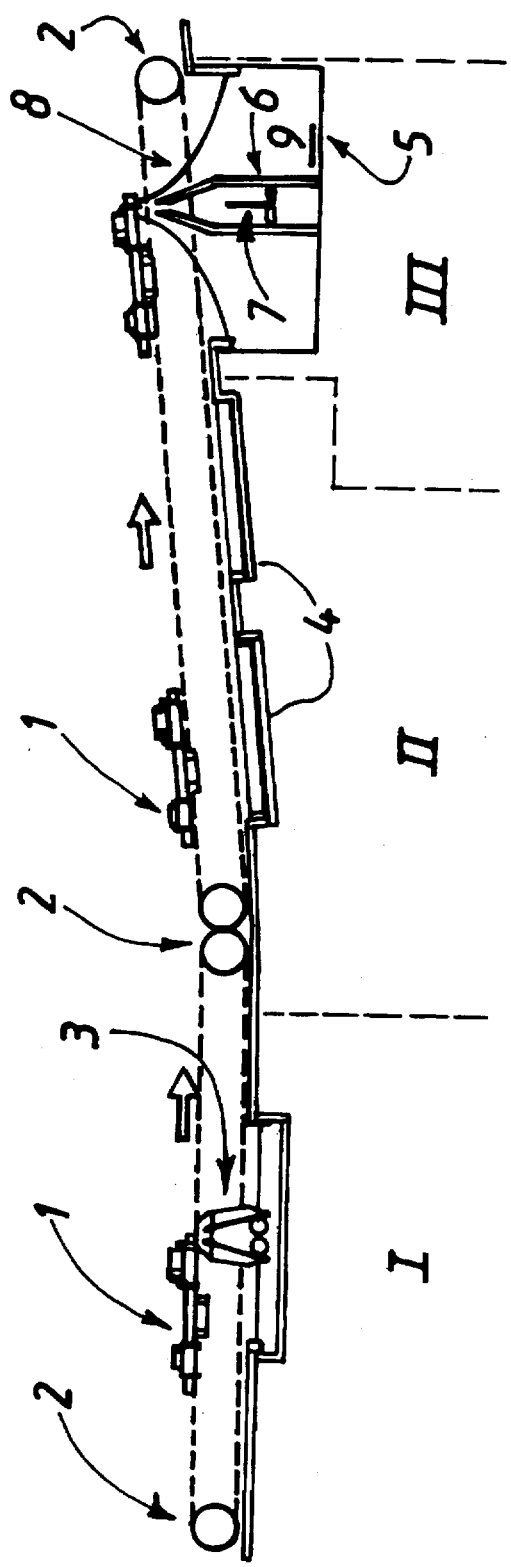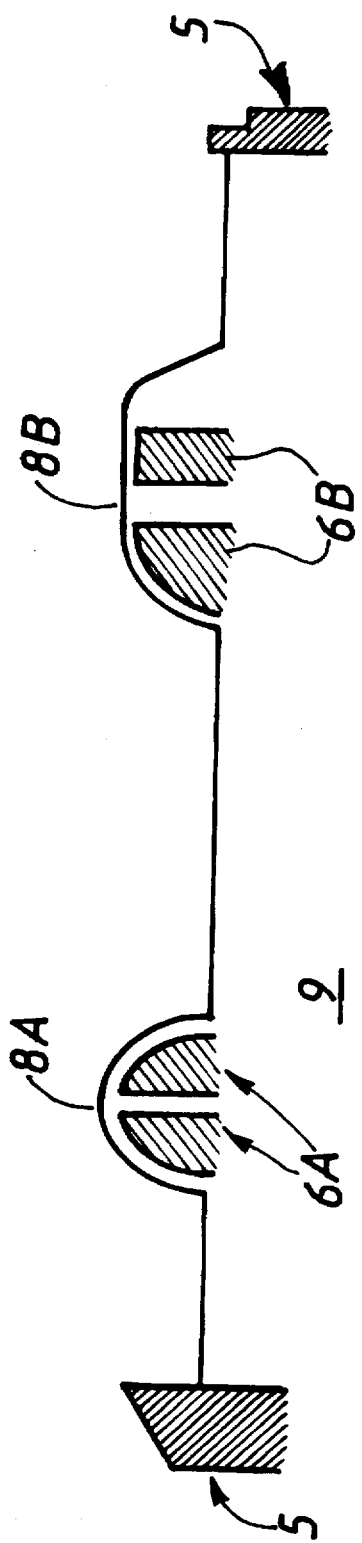

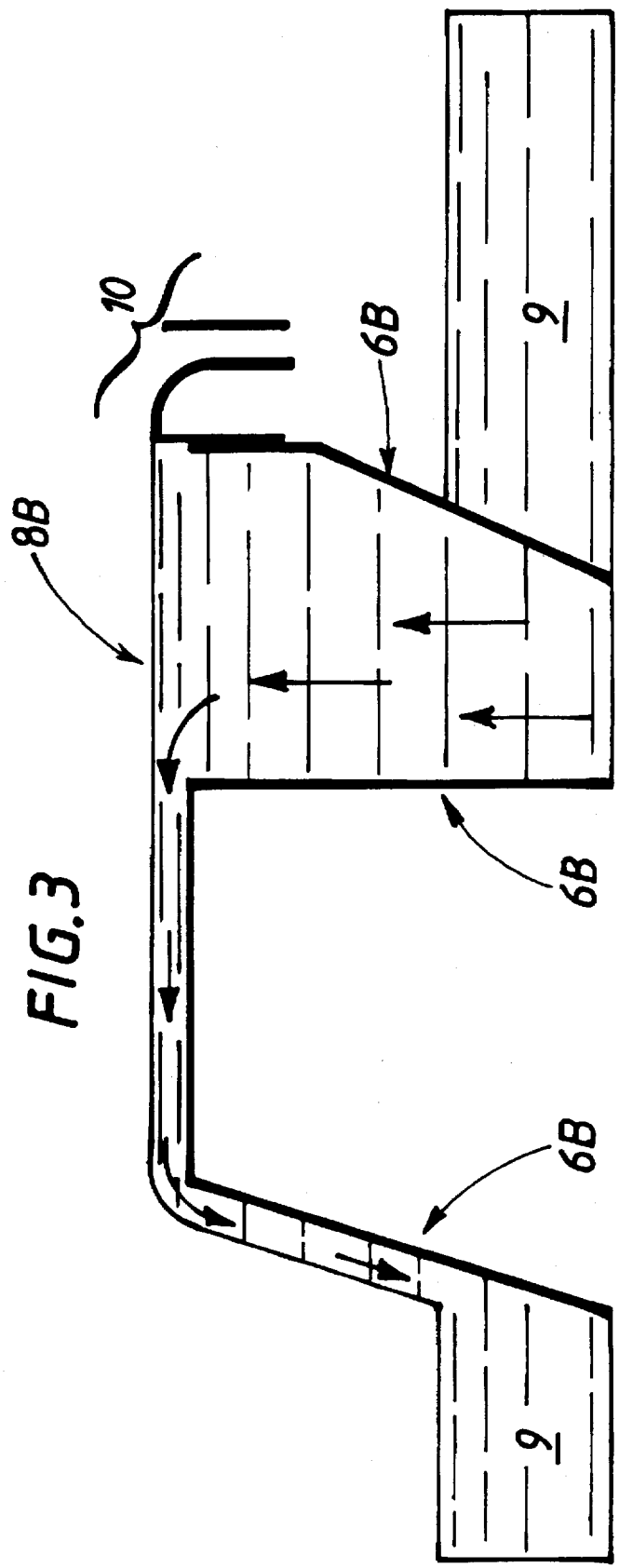

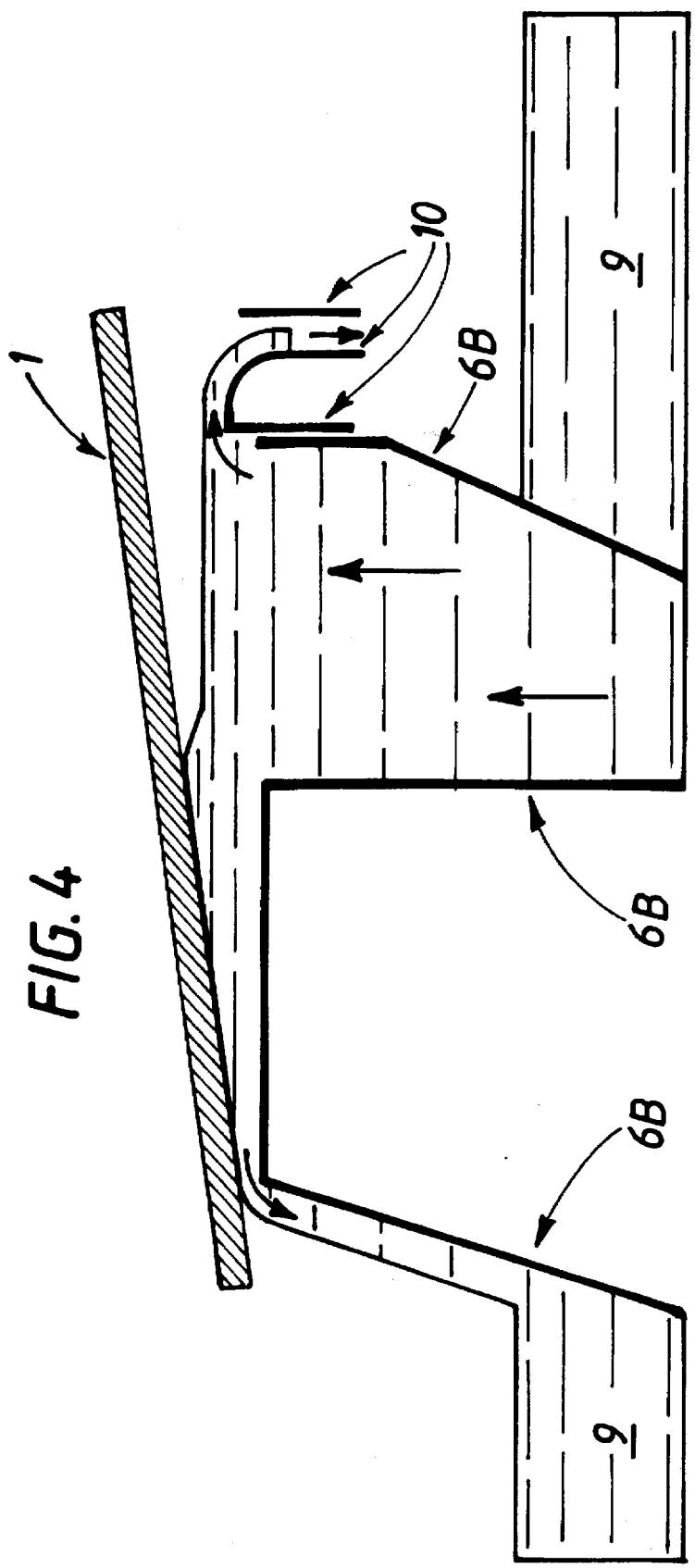

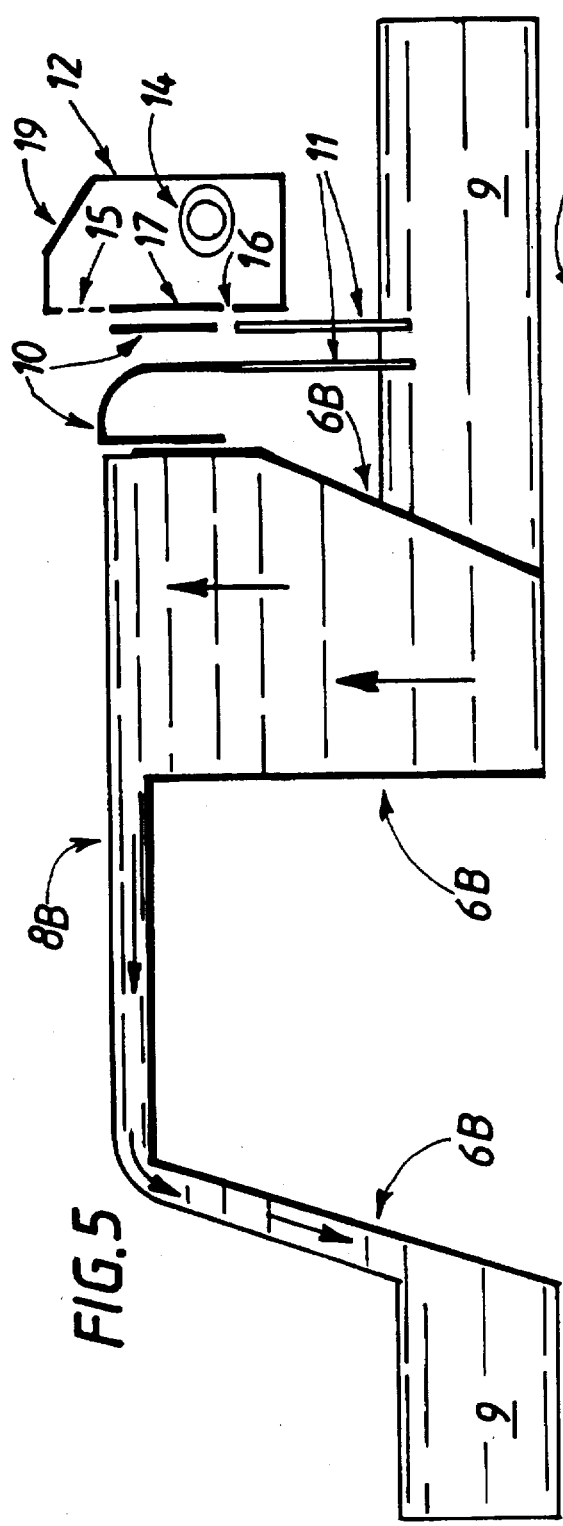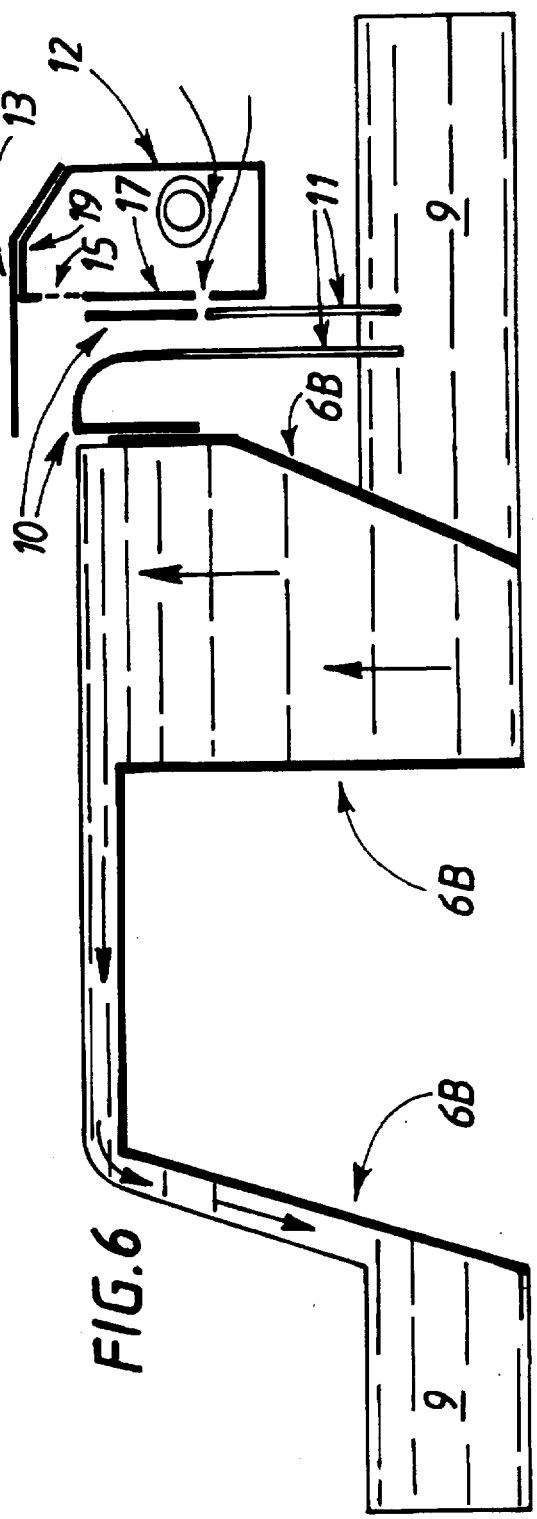

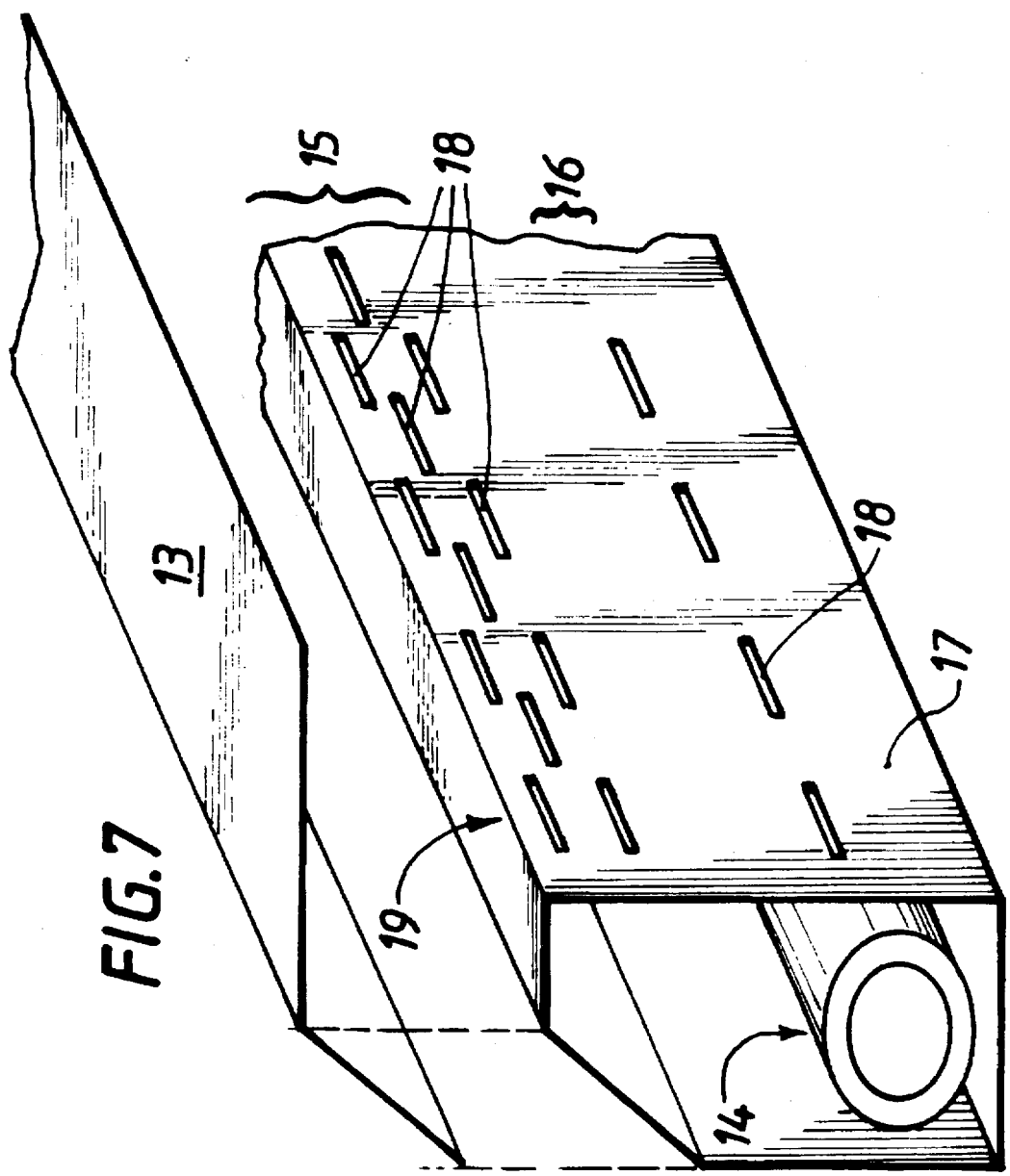

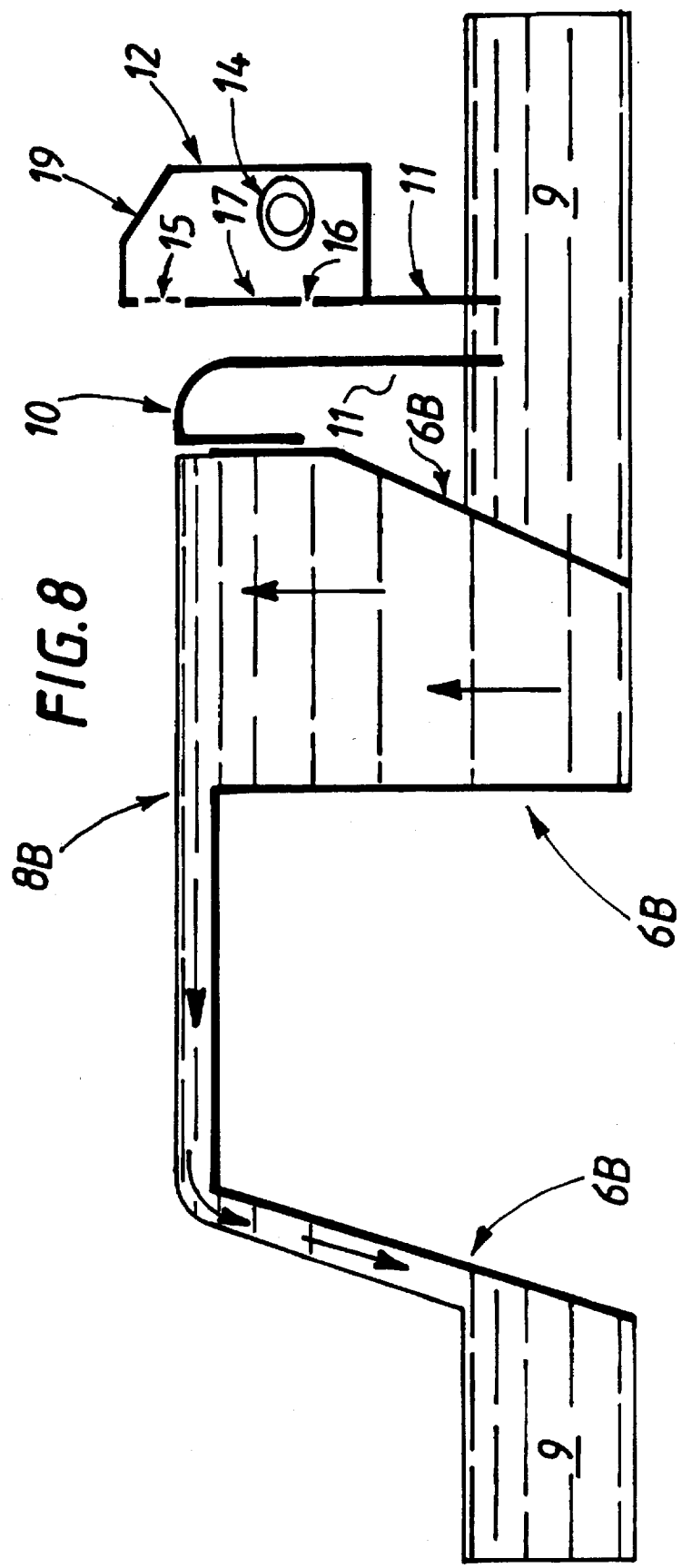

METHOD AND MACHINE FOR WAVE SOLDERING OR TINNING

BACKGROUND OF THE INVENTION (i) Field of the Invention

The invention relates to soldering and tinning operations carried out using machines comprising a bath of liquid solder, wherein the bath is either a "static bath" or is set in motion as in the machines known as "wave soldering" machines.

These machines are used in particular for soldering electronic components on a support such as an electronic circuit, or for tinning the terminals of electronic components.

(ii) Description of the Related Art

Wave soldering machines are designed in such a manner that the circuits to be soldered (or the pieces to be tinned) are brought into contact with one or more waves of liquid solder generated by pumping a solder bath residing in a tank through a nozzle.

The pieces are generally fluxed beforehand in a zone upstream from the machine, primarily to deoxidize the metal surfaces in order to facilitate their subsequent wetting by the solder. The fluxing operation is followed by a preheating operation which is carried out both in order to activate the flux previously deposited on the circuit and in order to preheat the circuits and components prior to their arrival in the hot soldering zone.

The geometric configuration of the nozzle determines the shape of the solder wave. Wave soldering machines usually have two waves, a first so-called "turbulent" wave and a second so-called "laminar" wave that presents a relatively large flat upper surface.

In the absence of pieces to be soldered or tinned in the machine, the liquid solder in this laminar wave area flows at very low speed in the upstream direction of the machine. When a piece arrives in contact with the laminar wave, a partial reversal of the alloy flow occurs and part of the alloy flows in the downstream direction of the machine.

The machines are therefore usually provided with what can be described as a weir system, whose height can be used to control the flow rate of the downstream flow of the solder. This weir system can consist simply of a metal plate or a guide chute for returning the solder to the surrounding bath.

One notes that the flow rate and the direction of flow of the alloy in this laminar wave area have a determining influence on the quality of the resulting soldering.

It must also be noted that some users, in order to adapt to the very specific characteristics of their production, substantially limit this downstream solder flow, preferring to establish a very slight or nearly zero downstream overflow of solder.

Wave soldering (or tinning) machines are usually open to the ambient air atmosphere. One problem encountered by the users of such machines is the formation of oxide layers (called dross) at the surface of the solder bath as a result of its exposure to air, resulting in a not insubstantial loss of solder and the need to regularly clean the bath. For example, a medium-size machine can give rise to the formation of more than a kilogram of dross per hour of operation.

Considering the specific case of the laminar wave, it is readily understood that a zero or excessively small downstream overflow of solder will represent a major disadvantage since the dross constantly forming on the flat surface of the wave cannot be effectively eliminated and thus is deposited on the piece with significant adverse effects on the quality of the resulting soldering or tinning.

Without requiring any further description, it will be readily comprehended that this dross-formation phenomenon, described here at length for the case of the flat surface of the laminar wave in a wave soldering machine, applies even more to the flat surface of a static bath.

Various technical solutions have been heretofore proposed for protecting the solder bath from oxidation by the surrounding air. These solutions can be schematically divided into the following three categories.

a) A first category of solutions consists of setting up a confined protection atmosphere, at least above the solder bath, but also sometimes in the rest of the machine. Thus, completely inertized machines have appeared, designed from the outset as a gas-tight tunnel, but there have also appeared more simply cowling or hood systems that can be used on existing conventional machines open to the ambient air to set up a nitrogen blanket at least in the area of the solder bath.

In this first category of solutions, the applicant of U.S. Pat. No. 5,161,727 has proposed an inertization apparatus comprising a set of cowlings defining, at least directly above the solder bath, an interior space separated from the surrounding atmosphere by gas-tight means, with systems of gas injection channels opening into the upper parts of the diffuser-equipped cowlings.

While the inertization apparatus described in the aforesaid document certainly represents a substantial improvement over the performance of the existing systems (particularly in terms of optimizing the compromise between the flow rate of the injected gas and the concentration of residual oxygen achieved above the solder bath), this system still represents relatively complicated and costly designs since it must be virtually custom-fitted to each type of wave soldering machine present on the market.

b) A second category of solutions involves setting up an unconfined protective atmosphere using injectors localized in proximity to the solder wave without closure of the space above the waves.

The devices taught in WO 93/11653 fall into this second category.

Taking into account their extremely localized configuration, it is considered difficult to control the quality of inertization afforded by these processes, necessitating in practice the use of two symmetrical injectors to successfully achieve a low oxygen level.

Furthermore, none of the documents in this category of solutions deal with and provide solutions for the specific problems posed by laminar waves.

c) The third category of solutions to the problem of dross formation employs the use, at the surface of the laminar wave, of a film of oil with a high covering power.

The oil protection systems have the traditional disadvantages associated with the use of oil (particularly in the presence of a heat source), which in particular include the presence of oil deposits on the board (necessitating the implementation of an often difficult and imperfect cleaning), the necessity for scheduling frequent periods for machine maintenance due to the accumulation of oil in the solder bath, and oil vapor emissions which certainly represent a nuisance for the environment, whether for people or equipment.

SUMMARY AND OBJECTS OF THE INVENTION

One object of the present invention is therefore to propose a wave soldering or tinning machine that can achieve a localized inertization (without requiring the use of a confinement system) of the flat surface of a laminar wave (as already indicated, the laminar wave exhibits very specific operating problems due to its extremely low flow) wherein the design of the machine makes it possible to very simply and economically obtain a very favorable compromise between the residual oxygen content achieved at the surface of the laminar wave and the flow rate of the gas employed in the area of this wave, wherein this flow rate, when necessary to conform to the economic specifications of particular user sites, can be below 10 m³/h and is preferably less than or equal to 5 m³/h.

Another object of the present invention is to propose conditions which make it possible to achieve a significant reduction in dross formation on the flat surface of the laminar wave of the machine.

Studies conducted by the applicant have shown that such results can be obtained by the use of a gas injector that is localized in a position adjacent to and downstream from the laminar wave and is provided with a wall facing this wave wherein this wall has at least one group of openings positioned thereon so as to generate a first gas jet directed toward the flat surface of the laminar wave.

These studies also demonstrated the advantageous features of the combined use of the following measures:

use of a weir system having, for example, the form of a plate or a guide chute, for the downstream spillover of the solder into the bath, wherein adjustment of the height of the weir system with respect to the wave permits adjustment of the flow rate of the laminar wave overflow in the forward direction (i.e., the downstream direction of the machine);

in the case of use of a plate, having this plate dip into the solder bath;

in the case of use of a chute, using a chute which dips into the bath, or equipping the chute with a skirt which dips into the bath, in order to extend its action to some degree; and use of a gas injector located in a position adjacent to and downstream from the laminar wave and provided with a wall facing this wave, wherein this wall has at least two groups of openings that direct the gas toward the wave, with a first group of openings being positioned so as to generate a first gas jet directed toward the flat surface of the laminar wave, while a second group of openings is positioned on the wall so as to inject a second gas jet into the space located between the plate and the injector (in the case of a "plate" weir) or in the interior of the skirt (in the case of "chute" weir).

As developed in greater detail below in connection with examples, the combined use of these measures gave an extremely effective inertization, even in the difficult case of a very nearly stagnant laminar wave, without requiring any confinement means: it was thus demonstrated that, at the time of board passage, a residual oxygen content of only a few tens of ppm could be obtained using a very moderate gas delivery rate (of only a few ma/h).

BRIEF DESCRIPTION OF THE DRAWINGS

FIG. 1 is a schematic representation of a conventional structure for a wave soldering machine;

FIG. 2 is a schematic partial section of a structure having two waves, turbulent and laminar;

FIG. 3 is a schematic representation of a laminar wave before the arrival of a piece (flow of solder in the upstream direction);

FIG. 4 is a schematic representation of a laminar wave during soldering (with a partially reversed solder flow: a part of the solder flows in the downstream direction with spillover into the chute 10);

FIG. 5 is a partial schematic representation of a machine according to the invention;

FIG. 6 is a partial schematic representation of a machine according to the invention, in which the injection means incorporates a deflecting piece 13;

FIG. 7 is a detailed view of the injector 12 of FIG. 6 incorporating a deflecting piece 13;

FIG. 8 is a schematic representation of one example of implementation of the chute/injector assembly when they have a common wall.

DETAILED DESCRIPTION OF PREFERRED EMBODIMENTS

Figure 9:
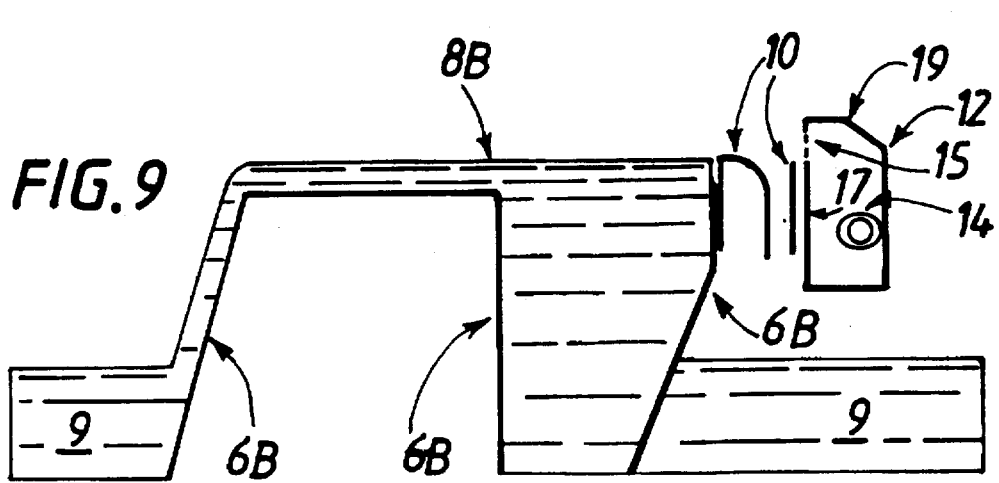
FIGS. 9, 10 and 11 schematically show three machine structures that were used to exemplify the implementation of the invention as well as comparative examples (examples which will be described in detail below in the present description).

The wave soldering or tinning machine according to the invention then comprises:

a solder reservoir;

means that forms at least one solder wave having a so-called laminar a conveyor system that brings a piece to be soldered or tinned into contact with the laminar wave; and means for injecting gas in the vicinity of the wave;

and is characterized in that the injection means includes an injector located in a position adjacent to and downstream from the wave and provided with a wall facing the solder wave, wherein this wall has at least a first group of openings positioned so as to generate a first gas jet directed toward the flat surface of the solder wave.

As indicated previously, according to an advantageous mode of implementation of the invention, the machine comprises a weir system whose height adjustment with respect to the wave serves to control the overflow flow rate of the wave in the downstream direction, wherein the said weir system takes the form of a chute that dips into the solder reservoir or is provided with a skirt structure that dips into the solder reservoir and the wall has a second group of openings positioned thereon so as to inject a second gas jet into the interior of the chute or the skirt.

According to one embodiment of the invention, the injector and the chute then have a common wall, which is provided with injection openings. As will be shown more clearly later in connection with the figures, with such a configuration the gas of the second jet passes directly from the interior of the injector to the interior of the skirt.

This configuration offers significant advantages in terms of ease of fabrication of the assembly and thus in the cost of implementation.

The injection of a second gas jet into the interior of the skirt can, for example, be implemented by arranging the second group of openings to face an opening whose boundaries lie in the wall of the skirt, or at the interface between the skirt and the chute, or in the lower part of the chute, depending on the initial geometry adopted.

According to an alternative embodiment of the invention, the machine comprises a weir system that takes the form of a plate that dips into the solder reservoir, wherein the wall of the injector then has a second group of openings positioned on the wall so as to inject a second gas jet into the space located between the plate and the injector. It is understood that in this last configuration the "chute" is here formed in some manner between the plate and the injector.

The "downstream" direction is to be understood as the direction in which the pieces to be soldered are conveyed in the machine.

The gas delivery "openings" according to the invention are to be understood as any type of hole configuration that allows the gas to escape from the injector, as is the case, for example, with conventional circular openings or slits.

The first group of openings is advantageously positioned on the wall of the injector so as to direct the first gas jet tangential to the flat surface of the laminar wave. Such an arrangement will help produce a Coanda effect for the gas jet on the surface of the wave, thus rendering the inertization more effective.

The described arrangement for injection of the second gas jet into the interior of the skirt proves unexpectedly effective for avoiding the parasitic phenomena of air entrainment by the first gas jet.

The openings of at least one of the groups of openings are advantageously dimensioned so as to obtain at the outlet of the openings under consideration a gas velocity in the interval between 0.5 and 30 m/s. Preferably, however, the gas velocity will be in a velocity range from 0.5 to 10 m/s, and more preferably in a narrower range from 0.5 to 5 m/s.

According to one embodiment of the invention, the injection means extends over the entire width of the laminar wave, thus more effectively accommodating the dimensions of all the pieces that can be treated in the machine under consideration.

According to one embodiment of the invention, the first group of openings consists of at least one row of slits whose boundaries lie in the wall of the injector facing the wave.

The injection means can comprise means for delivering the gas to the interior of the injector, which can, for example, consist of a porous tube located well inside the interior of the injector and adapted for feed from the outside with the gas under consideration, or which can consist of a simple "clarinet," a term that has been traditionally applied to refer to a tube pierced with holes.

According to one aspect of the invention, the injector is provided with an upper face or wall. The studies conducted by the applicant have demonstrated that it is then advantageous to employ a deflecting piece solidly attached to this upper wall.

Such a deflecting piece preferably extends along the entire length of the injector.

According to an advantageous embodiment of the invention, the deflecting piece (as necessary taking into account the position of the injector with respect to the wave) is dimensioned in its width so as to at least cover the weir system (for example, the chute).

The position of the injector will preferably be adjustable horizontally and/or vertically.

As will be clearly apparent to the individual skilled in the art, the soldering or tinning machine according to the invention permits use in the injector of any type of gas, whether it be a neutral gas (such as nitrogen, regardless of its mode of production and its purity) or a more active gas such as, for example, neutral gas/reducing gas mixtures.

The invention also concerns a method for the wave soldering or tinning of a piece in which a piece to be soldered or tinned is brought into contact with at least one wave of liquid solder in so-called laminar form and in which a protective gas is directed over at least a portion of the wave, wherein said method is characterized in that the protective gas is directed over the wave by means of an injector that is located in a position adjacent to and downstream from the wave and is provided with a wall facing the wave, wherein at least one group of openings is positioned on the wall so as to generate a first gas jet directed toward the flat surface of the laminar wave and the velocity of the gas as it emerges from the openings is between 0.5 and 30 m/s, but preferably between 0.5 and 10 m/s, and more preferably between 0.5 and 5 m/s.

According to an advantageous embodiment of the method according to the invention, the flow rate of the solder wave overflow in the downstream direction is controlled by the use of a weir system whose height is adjustable with respect to the wave, wherein the said weir system has the form of a chute that dips into the solder reservoir or is provided with a skirt that dips into the solder reservoir and the wall of the injector then has a second group of openings positioned thereon so as to inject a second gas jet into the interior of the descending chute or skirt.

In an alternative embodiment, the flow rate of solder wave overflow in the downstream direction is adjusted through the use of a weir system that has the form of a plate that dips into the solder reservoir, wherein the wall of the injector has a second group of openings positioned thereon so as to inject a second gas jet into the space located between the plate and the injector.

The invention also relates to a device for inertizing the laminar wave of a wave soldering or tinning machine, that has a gas injector located in a position adjacent to and downstream from the lamina wave and provided with a wall facing the lamina wave, wherein the said wall has at least a first group of openings positioned thereon so as to generate a first gas jet directed toward the flat surface of the laminar wave.

According to one implementation of the invention, the injector is provided with an upper wall and the device includes a deflecting piece solidly attached to the upper wall of the injector.

According to one aspect of the invention, the soldering or tinning machine comprises a weir system whose height adjustment with respect to the wave serves to control the flow rate of solder wave overflow in the downstream direction of the machine, wherein the weir system has the form of a plate dipping into the solder reservoir or a guide chute that dips into the solder reservoir or is provided with a skirt that dips into the solder reservoir and the wall of the injector of the device then has a second group of openings positioned on the wall so as to generate a second gas jet directed at the interior of the chute or at the interior of the space between the plate and the injector.

Other characteristics and advantages of the invention will emerge from the following description of modes of implementation provided for illustration but completely nonrestrictive, in connection with the attached drawings in which:

The wave soldering machine shown schematically in FIG. 1 comprises three zones: a zone I for fluxing pieces 1 with a fluxing system 3 (for example, a wet type); a zone II for preheating the fluxed pieces that uses a means 4, for example, consisting of infrared lamps; and a zone III for soldering proper, where the pieces 1 encounter, in the mode of implementation shown, a single solder wave 8 obtained by pumping (7) the solder bath 9 through a solder nozzle 6.

The boards 1 are conveyed through the different zones of the machine by a conveyor system 2, for example, consisting of frames traveling along two side belts located on each side of the machine, or "finger"-type conveyor chains.

FIG. 2 provides a schematic partial view, in section, of a case in which the solder bath 9 is used to produce a dual-wave structure, with a first so-called turbulent wave 8a having a relatively steep structure (obtained as a result of the structure of nozzle 6a), and a second wave 8b of laminar structure that offers a flat upper surface of relatively large size and is obtained as a result of the structure of nozzle 6b.

FIGS. 3 and 4 illustrate the solder flow in the laminar wave 8b, respectively, prior to the arrival of a piece and during the soldering of a board 1.

FIG. 3 thus illustrates the state prior to the arrival of a piece with flow of the solder in the upstream direction of the machine. The embodiment represented here includes the use of a weir system 10, which in this case takes the form of a guide chute that is located just downstream from the nozzle. Adjusting the height of the guide chute functions to control the flow rate of solder spillover in the downstream direction (here, a zero or nearly zero flow under the given circumstances).

Although this figure shows a vertical section of the chute structure, as will be clearly apparent to the individual skilled in the art, the space between the two "walls" of the chute is closed at its two ends by the sides of the reservoir or by two special plates arranged at each end (defining in horizontal section a rectangular or quasirectangular structure).

The possible phenomenon of partial downstream spillover is better visualized in the context of FIG. 4.

The arrival of the piece 1 on the laminar wave causes a partial reversal of the flow of the liquid solder into the downstream direction of the machine (i.e., in the forward direction). The spillover flow rate in the forward direction can be controlled by the height of the chute system 10. In addition, the use of such a chute (in place of a simple plate joined to the nozzle 6b) affords a better guidance and return of the solder spillover into the bath 9.

FIG. 5 is a partial schematic illustration of one mode of implementation of a wave soldering or tinning machine according to the invention. This representation is a partial representation in that it focuses on the laminar wave/injector/chute/skirt arrangement.

The wave here is represented in the position prior to the arrival of a piece with flow in the upstream direction.

The figure depicts an immersed skirt 11 that is solidly attached to the chute system 10, facing which is a gas injector 12 having one face or wall 17 that has two groups of openings 15 and 16 whose structure will be described in detail later in connection with the perspective view in FIG. 7.

As will be understood in light of the entire preceding description, we have chosen to represent in FIG. 5 the chute and skirt solidly attached thereto by two different types of lines in order to make it easier to understand the figure. As already indicated earlier, the chute and skirt according to the invention need not be two disjointed pieces that have been solidly attached, but rather one can use an immersed chute from the beginning.

The groups of openings 15 and 16 are respectively positioned so as to direct a first gas jet toward the flat surface of the laminar wave 8b and a second gas jet into the interior of the immersed skirt 11. As indicated above, the presence of the immersed skirt 11 and the second gas jet in the interior of the skirt is especially effective for avoiding any effects from air entrainment on the flat surface of the laminar wave.

The interior of the injector 12 contains a porous tube 14, which is supplied from the outside with gas and which distributes this gas in the interior of the expansion chamber that constitutes the body of the injector 12.

The structure shown schematically in FIG. 6 is similar to that represented in FIG. 5, with the exception of the presence of a deflecting piece 13 solidly attached to an upper wall 19 of the injector 12.

Here also, as developed in greater detail below in connection with examples, the presence of the deflecting piece 13 proves to be very effective for achieving—if necessary—very low residual oxygen levels in the area of the flat surface of the laminar wave.

This FIG. 6 illustrates an advantageous embodiment of the invention wherein the width of the deflecting piece (if need be, in conjunction with the position of the injector with respect to the wave) permits it to extend far enough to at least cover the chute system.

FIG. 7, which is a detailed partial view of the injector 12 and the deflecting piece 13 in FIG. 6, allows a better comprehension of the respective positions of the deflecting piece 13 and the injector 12—in particular the disposition of this deflecting piece 13 on the upper wall 19 of the injector. This figure also provides a better visualization of the configuration of the openings of the two groups of openings 15 and 16.

In the embodiment represented, the groups of openings 15 and 16 are composed, respectively, of three rows of slits 18 and of one row of slits 18, in each case located in the wall 17 of the injector 12 and extending along the entire length of this injector.

FIG. 8 illustrates a particular mode of the invention in which the chute and injector have a common wall. One notes in effect that the wall 17 of the injector here forms one of the walls of the chute, wherein this wall is extended as one of the sides of the skirt 11.

One also notes that in such a configuration the second gas jet originating with the second group 16 of openings passes directly from the interior of the injector 12 to the interior of the skirt 11.

Figure 10:
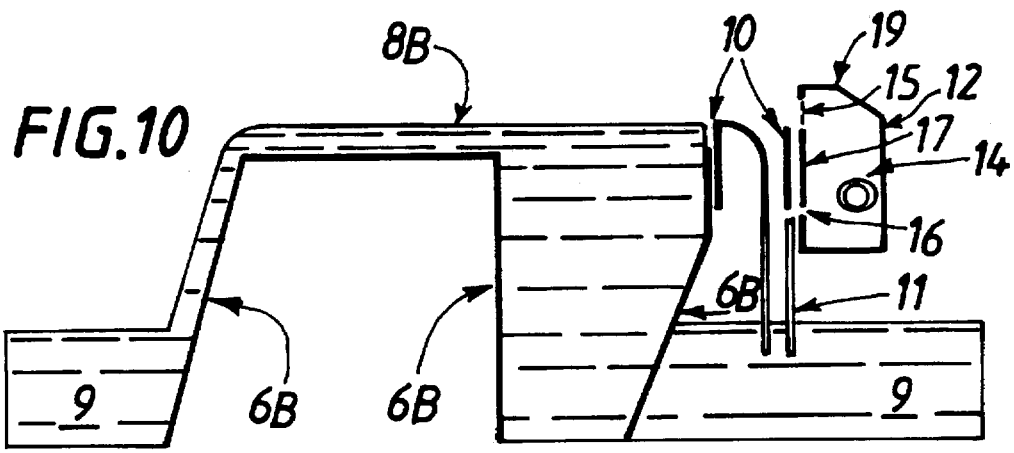
Figure 11:
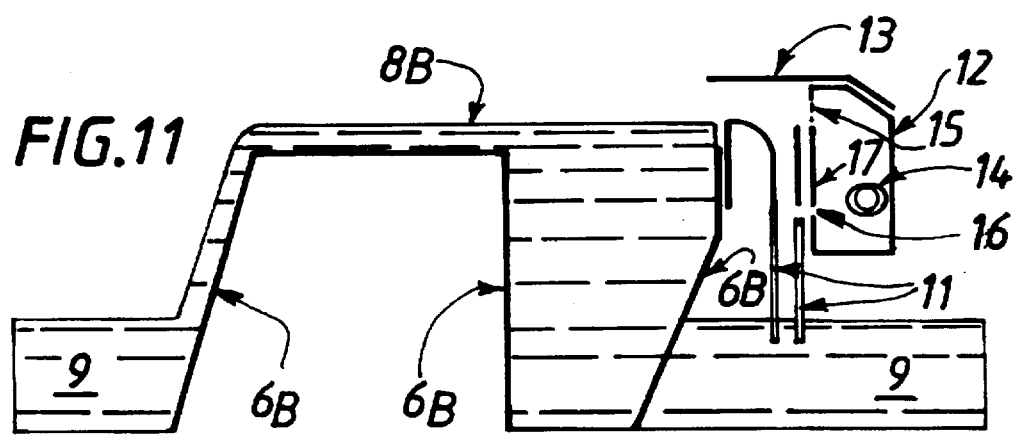

FIGS. 9, 10, and 11 illustrate configurations that implement the examples detailed below:

FIG. 9: the chute 10 is not provided with a skirt (or more simply the chute is not an immersed chute) and the wall 17 of the injector is not provided with the second group of openings;

FIG. 10: the chute 10 is provided with a skirt 11 and the wall 17 of the injector is provided with the second group of openings; and FIG. 11: a configuration identical to that of FIG. 10, but including also a deflecting piece 13.

A first set of evaluations was carried out using these three configurations in a dual-wave soldering machine: the residual oxygen level at the surface of the laminar wave was measured both in the presence and absence of boards to be soldered. The formation of dross, or absence thereof, on the flat surface of the laminar wave was also systematically evaluated.

In all cases, the nitrogen delivery rate employed by the injector was approximately 80 L/minute.

The nitrogen used was cryogenic nitrogen with a residual oxygen concentration less than or equal to 10 ppm.

In a second set of evaluations carried out using the structure of FIG. 11, the presence/absence of two types of soldering defects (solder gaps and short circuits (solder bridges)) was scored on electronic boards soldered in the machine. The evaluation was carried out both under nitrogen (delivery rate given above) and under air.

The observed results can be summarized as follows:
a1) residual oxygen level by volume):
in the case of FIG. 9:

| in the absence of boards: | ≅ 120,000 ppm; |
|---|---|
| in the presence of boards: | < 1%; | in the case of FIG. 10:

| in the absence of boards: | ≅ 30,000 ppm; |
|---|---|
| in the presence of boards: | ≅ 70 ppm; | in the case of FIG. 11:

| in the absence of boards: | ≅ 8,000 ppm; |
|---|---|
| in the presence of boards: | ≅ 45 ppm; | a2) dross evaluation:

The proportion of dross in the presence of boards was greatly decreased for all the tested configurations, and the last two configurations even permitted the flat surface of the wave to be preserved in its traditional mirror appearance.

b) rate of soldering defects:

The results described here (in ppm defects) represent the cumulative results for 200 soldered boards.

|  | under air | under $N_2$ |
|---|---|---|
| short circuit | ≅ 4800 | ≅ 2000 |
| gaps in solder | ≅ 200 | ≅ 70 |

Thus, read as a whole these results demonstrate that the wave soldering machine and method according to the invention achieve, in dramatic fashion and with an extremely moderate nitrogen consumption, very low residual oxygen levels at the surface of the laminar wave, which consistently correspond with a clear improvement in the obtained soldering performance and with excellent results in terms of dross formation.

I claim:

1. Wave soldering or tinning machine comprising:
   a solder reservoir;
   a means that forms at least one solder wave having a laminar form and including a flat surface;
   a means for bringing a piece to be soldered or tinned into contact with said laminar wave; and
   means for injection of a gas in the vicinity of the wave comprising an injector located in a position adjacent to and downstream from the wave and provided with a wall facing the solder wave, wherein said wall has at least a first group of openings positioned so as to produce a first gas jet directed toward the flat surface of the solder wave.

2. Machine according to claim 1, further comprising a weir system for control of overflow of said wave in a downstream direction wherein an adjustment of height of said weir with respect to the wave can control flow rate of the wave overflow in the downstream direction, wherein said weir system comprises a chute including an interior that dips into the solder reservoir or a skirt structure including an interior that dips into the solder reservoir and said wall of the injector has a second group of openings positioned on the wall so as to inject a second gas jet into the interior of said dipping chute or skirt.

3. Machine according to claim 2, wherein the injector and the chute have a common wall.

4. Machine according to claim 1, further comprising a weir system for control of overflow of said wave in a downstream direction wherein an adjustment of height of said weir with respect to the wave can control flow rate of the wave overflow in the downstream direction, wherein said weir system comprises a plate that dips into the solder reservoir and said wall of the injector has a second group of openings located on the wall so as to inject a second gas jet into the space located between the plate and the injector.

5. Machine according to claim 1, wherein the first group of openings is positioned so as to direct the first gas jet tangential to the flat surface of the laminar wave.

6. Machine according to claim 2, wherein the openings of at least one of the two groups are dimensioned so as to obtain a velocity for a gas emerging from the openings of between 0.5 and 30 m/s.

7. Machine according to claim 1, wherein at least one of the two groups of openings comprises at least one row of slits.

8. Machine according to claim 1, wherein the gas injector extends across the entire width of the laminar wave.

9. Machine according to claim 1, wherein the injector comprises an upper wall.

10. Machine according to claim 9, further comprising a deflecting piece solidly attached to the upper wall of the injector.

11. Machine according to claim 10, wherein the deflecting piece extends over the entire width of the injector.

12. Method for wave soldering or tinning comprising the steps of bringing a piece to be soldered or tinned into contact with at least one wave of liquid solder having a laminar form and including a flat surface and directing a protective gas over at least a portion of the wave by means of an injector that is located in a position adjacent to and downstream from the wave and is provided with a wall facing the wave, wherein said wall has at least a first group of openings positioned thereon so as to generate a first gas jet directed toward the flat surface of the laminar wave, the gas emerging from the openings having a velocity between 0.5 and 30 m/s.

13. Method according to claim 12, wherein the velocity of gas emerging from the openings is between 0.5 and 10 m/s.

14. Method according to claim 12 further comprising the step of controlling flow rate of overflow of the solder wave in a downstream direction with a weir system having an adjustable height with respect to the wave, wherein said weir system comprises a chute including an interior that dips into the solder reservoir or a skirt including an interior that dips into the solder reservoir, wherein said wall of the injector comprises a second group of openings positioned on the wall so as to inject a second gas jet into the interior of the dipping chute or skirt.

15. Method according to claim 12 further comprising the step of controlling flow rate of overflow of the solder wave in a downstream direction with a weir system having an adjustable height with respect to the wave, wherein said weir system comprises a plate that dips into the solder reservoir and said wall has a second group of openings located on the wall so as to inject a second gas jet into a space located between the plate and the injector.

16. Device for inertization of a laminar wave including a flat surface of a wave soldering or tinning machine, comprising a gas injector that is located in a position adjacent to and downstream from the laminar wave and comprising a wall facing the laminar wave, wherein said wall has at least a first group of openings positioned on the wall so as to generate a first gas jet directed toward the flat surface of the laminar wave.

17. Device according to claim 16, wherein the injector comprises an upper wall and at least one deflecting piece solidly attached to the upper wall of the injector.

18. Device according to claim 16 wherein said soldering or tinning machine further comprises a weir system having an adjustable height with respect to the wave which can control flow rate of solder wave overflow in a downstream direction of the machine, wherein said weir system comprises a plate including an interior or a guide chute including an interior and the wall of the injector is provided with a second group of openings located on the wall so as to generate a second gas jet directed at the interior of the chute or at the interior of a space between the plate and the injector.

19. Machine according to claim 6, wherein the velocity of the gas emerging from the openings is between 0.5 and 10 m/s.

20. Method according to claim 13, wherein the velocity of the gas emerging from the openings is between 0.5 and 5 m/s.

* * * * *